(12) United States Patent
Zoppas et al.

(10) Patent No.: US 7,678,304 B2
(45) Date of Patent: Mar. 16, 2010

(54) APPARATUS FOR BLOW MOULDING OF PLASTIC OBJECTS

(75) Inventors: Matteo Zoppas, Fontanafredda (IT); Giovanni Chiarotto, Cordenons (IT)

(73) Assignee: S.I.P.A. Societa Industrializzazione Progettazione e. Automazione S.p.A., Vittorio (IT)

( * ) Notice: Subject to any disclaimer, the term of this patent is extended or adjusted under 35 U.S.C. 154(b) by 461 days.

(21) Appl. No.: 11/547,425

(22) PCT Filed: Mar. 25, 2005

(86) PCT No.: PCT/EP2005/051402

§ 371 (c)(1), (2), (4) Date: Sep. 29, 2006

(87) PCT Pub. No.: WO2005/095086

PCT Pub. Date: Oct. 13, 2005

(65) Prior Publication Data

US 2007/0275113 A1    Nov. 29, 2007

(30) Foreign Application Priority Data

Mar. 30, 2004 (IT) .................. RM2004A0163

(51) Int. Cl.
*B29C 49/78* (2006.01)

(52) U.S. Cl. ............. 264/40.1; 264/538; 425/135; 425/535; 425/540

(58) Field of Classification Search ............... 264/538, 264/40.1; 425/135, 525, 535, 538, 540
See application file for complete search history.

(56) References Cited

U.S. PATENT DOCUMENTS

| | | |
|---|---|---|
| 1,439,284 A | 12/1922 | Ayres |
| 2,757,267 A | 7/1956 | Brauer et al. |
| 3,302,556 A | 2/1967 | Durbin |
| 3,604,880 A | 9/1971 | O'Neill |
| 3,624,672 A | 11/1971 | Spivy |

(Continued)

FOREIGN PATENT DOCUMENTS

DE        19608135 A1    9/1997

(Continued)

OTHER PUBLICATIONS

Partial machine translation of JP2000117825A dated Apr. 2000 obtained from the JPO website.*

(Continued)

*Primary Examiner*—Robert B Davis
(74) *Attorney, Agent, or Firm*—Knobbe Martens Olson & Bear LLP

(57) ABSTRACT

An apparatus for blow moulding of bottles in plastic material comprising a rotating turntable provided with moulds (4) on its outer circumference. Each mould (4) has three moulding forms (5, 6, 7) that can be controlled separately during the parison blowing operations so as not to blow those forms that may not have been supplied with parisons (12).

6 Claims, 4 Drawing Sheets

U.S. PATENT DOCUMENTS

| | | | |
|---|---|---|---|
| 4,268,240 | A | 5/1981 | Rees et al. |
| 4,268,241 | A | 5/1981 | Rees et al. |
| 4,315,725 | A | 2/1982 | Yoshino |
| 4,560,430 | A | 12/1985 | Watanabe et al. |
| 4,726,754 | A | 2/1988 | Breuker et al. |
| 4,801,260 | A * | 1/1989 | Oles et al. ............... 425/527 |
| 4,832,593 | A | 5/1989 | Brown |
| 4,968,242 | A | 11/1990 | Anderson |
| 4,996,779 | A | 3/1991 | Nakagomi et al. |
| 5,180,893 | A | 1/1993 | Sugiyama et al. |
| 5,244,610 | A | 9/1993 | Kitzmiller |
| 5,513,445 | A | 5/1996 | Farrag |
| 5,593,711 | A | 1/1997 | Glaesener |
| 5,658,619 | A | 8/1997 | Kirschner et al. |
| 5,674,439 | A | 10/1997 | Hume et al. |
| 5,776,402 | A | 7/1998 | Glaesener |
| 6,027,329 | A | 2/2000 | Nazarian et al. |
| 6,171,097 | B1 | 1/2001 | Urbanek |
| 6,386,857 | B1 * | 5/2002 | Nava ........................ 425/526 |
| 6,391,244 | B1 | 5/2002 | Chen |
| 6,402,497 | B1 | 6/2002 | Banjyo et al. |
| 6,844,533 | B1 | 1/2005 | Chuang |
| 6,869,276 | B2 | 3/2005 | Babin et al. |
| 7,048,535 | B2 | 5/2006 | Takanohashi |
| 7,080,978 | B2 | 7/2006 | Glaesener |
| 2002/0136794 | A1 | 9/2002 | Cargile et al. |
| 2004/0164070 | A1 | 8/2004 | Terano |
| 2004/0173949 | A1 | 9/2004 | Storione et al. |

FOREIGN PATENT DOCUMENTS

| | | | |
|---|---|---|---|
| DE | 102004022036 B3 | | 7/2005 |
| EP | 0 849 067 | | 6/1998 |
| EP | 0 909 711 | | 4/1999 |
| EP | 0914924 | A | 5/1999 |
| EP | 1 367 348 | | 12/2003 |
| FR | 1430899 | | 3/1966 |
| FR | 2 576 283 | A | 7/1986 |
| FR | 2 837 738 | A | 10/2003 |
| FR | 2 839 041 | A | 10/2003 |
| GB | 402561 | | 12/1933 |
| GB | 936 147 | A | 9/1963 |
| JP | 06-155510 | | 6/1994 |
| JP | 11-240046 | | 9/1999 |
| JP | 2000117825 | A * | 4/2000 |
| JP | 2002-067113 | | 3/2002 |
| WO | WO 8901400 | A * | 2/1989 |
| WO | WO 9962692 | | 12/1999 |
| WO | WO 0056510 | A | 9/2000 |
| WO | WO 01/49075 | A | 7/2001 |
| WO | WO 03/072265 | | 9/2003 |
| WO | WO 03/086734 | | 10/2003 |
| WO | WO 2004/024346 A2 | | 3/2004 |

OTHER PUBLICATIONS

Derwent abstract 2000-358554 which describes JP2000117825A dated Apr. 2000.*

* cited by examiner

APPARATUS FOR BLOW MOULDING OF PLASTIC OBJECTS

FIELD OF THE INVENTION

The present invention relates to an apparatus for blow moulding for manufacturing containers made of thermoplastic resin, in particular for bottles made of polyethylene terephthalate (PET) or in polypropylene (PP) or in another plastic material.

PRIOR ART

Today the manufacturing of plastic containers, particularly of bottles, is very widespread by means of utilization of high hourly production moulding equipment, which in the technical sector are conventionally divided into two groups: the single-step system or two-step system.

In a so-called two step process, a previously moulded parison, for example by means of injection or compression, is subsequently cooled, in a successive step is re-heated in order to bring it to a predetermined temperature and then blow moulded to transform it into the desired final shape.

In contrast, the single-step processes are so defined due to the fact that parisons are transferred directly from the injection mould immediately at the end of that operation without being passed through a cooling phase to an ambient temperature and are moulded by means of blow moulding.

In both types of systems, the blow mechanism can be realized by using moulds arranged linearly or moulds arranged around a turntable rotating about its axis. The rotating blow-moulding devices are more capable of attaining higher hourly rates of production, in that they operate continuously. Some of these systems are described in the patent documents U.S. Pat. No. 4,850,850, U.S. Pat. No. 4,313,720, WO 95/05933, WO 89/01400.

In particular, the document WO 89/01400 illustrates an arrangement in which the blow semi-moulds open and close freely around their respective axes of rotation, perpendicular to the plane, in which the parisons and finished containers move.

In order to maximally increase the hourly rate of production of these forms, solutions are also described in which the moulds are provided with two cavities or two mould forms which open and close contemporaneously. In this type of machine the two-form moulds have then to be arranged in two alternative fashions. The first one consist of aligning the axes of the mould forms along the radius of the turntable and the second one consists of arranging the defined axes of the mould forms on tangentially disposed planes at the circumference of the turntable. This second arrangement makes it possible to reduce the kinematic movements for inserting and extracting the two blown containers from the mould. Still, there is a necessity of improving the operational flexibility of such blowing systems. This can be necessary, for example, in the course of its use in periods of reduced production of beverage containers or in the case, wherein bottles having special shapes are produced in small production numbers. In such cases, the use of one single mould form versus two that comprise the mould is complex.

Another drawback of this type of moulding system is that when a parison is not inserted into one of the two forms for which it is intended during a specific cycle, whilst in the other form one is not inserted, for example, due to an obstruction in the parison distribution system. In this case, the control system must block blow-forming of both of the form components of the mould with a resulting waste of a parison or of the one that is situated correctly in its predetermined position and with waste of a moulding cycle for one mould of the turntable.

SUMMARY OF THE INVENTION

Therefore, an object of the present invention is to eliminate the aforementioned drawbacks by providing an apparatus for blow-forming containers that is functionally reliable, has a high degree of flexibility for being adapted to various production requirements of the user and in addition reduces the number of rejects. These objects and others which will become more apparent when reading this description are achieved by means of an apparatus for blow-form moulding that has the characteristics of the main claim.

According to another feature of the invention, these objects are achieved by means of a blow-form moulding method for blow-forming.

LIST OF FIGURES

Other attainable advantages will become more apparent to the skilled person from the following detailed description of a non-limiting embodiment of a blow-moulding apparatus given by way of example with reference to the following figures, wherein.

Figure 1:
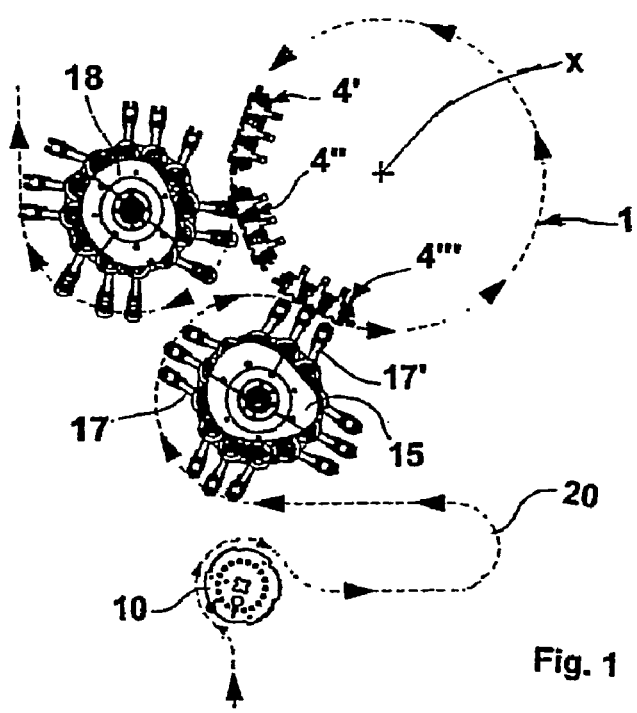
FIG. 1 shows a plan view of a blow-moulding apparatus according to the invention.
Figure 2:
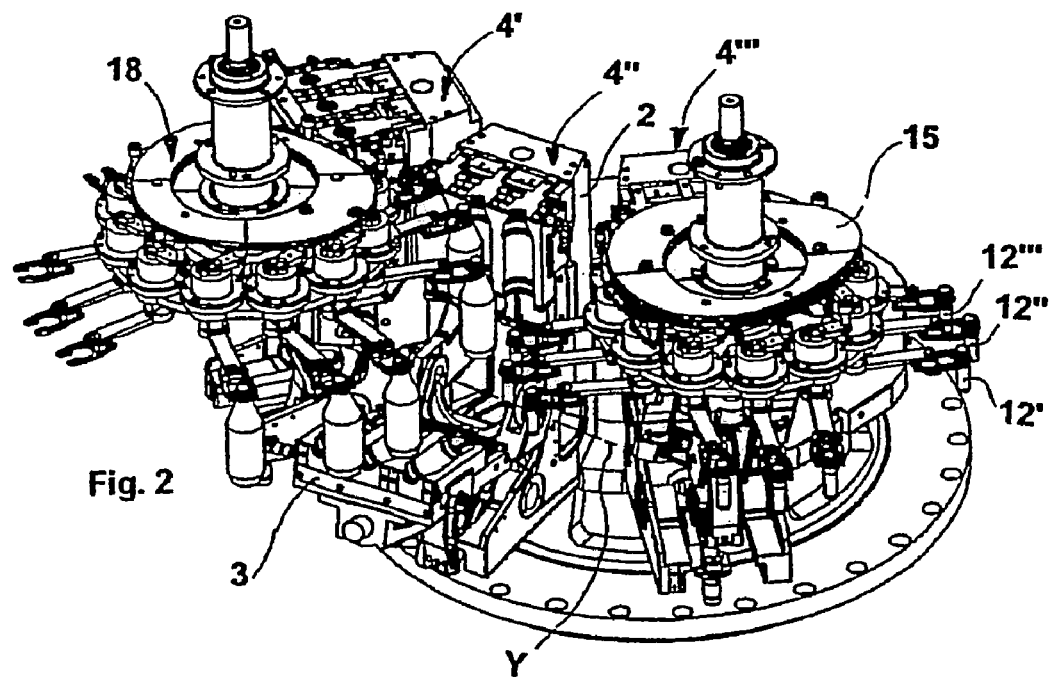
FIG. 2 shows a perspective view of a part of the blow-moulding apparatus of FIG. 1.
Figure 3:
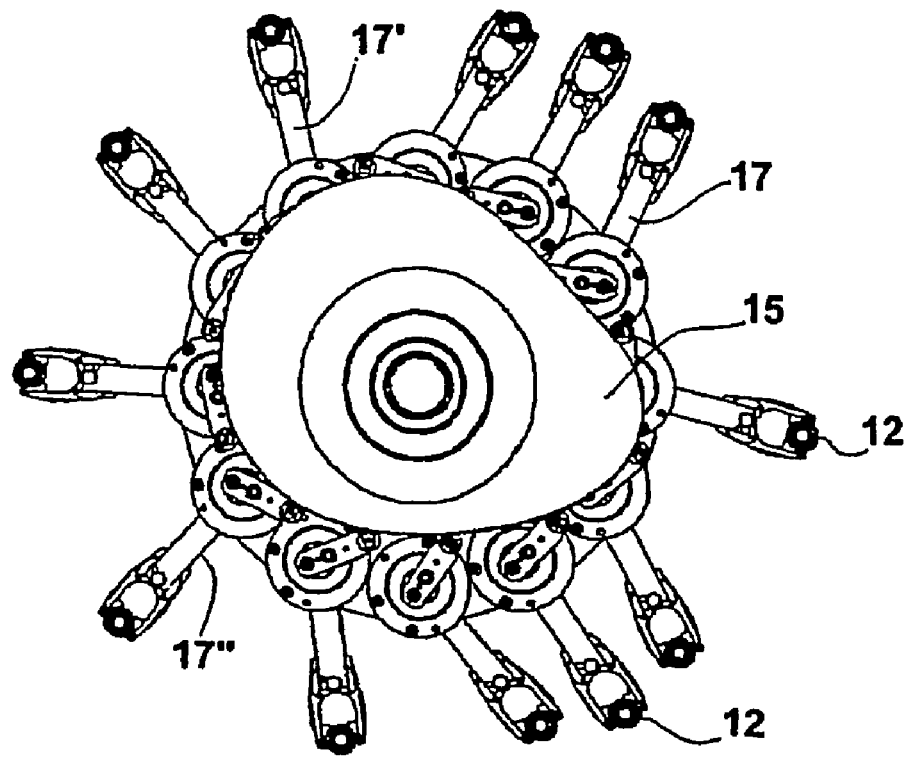
FIG. 3 shows a plan view of an enlarged element of the system of FIG. 1.
Figure 6:
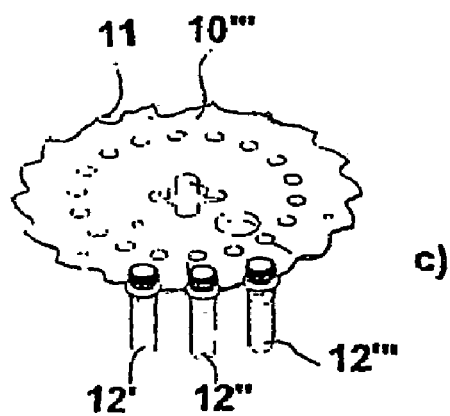
Figure 6:
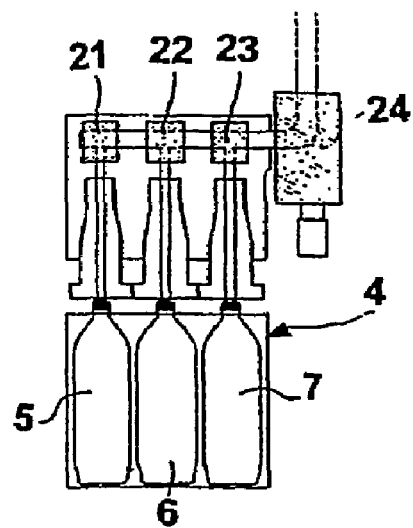
Figure 7:
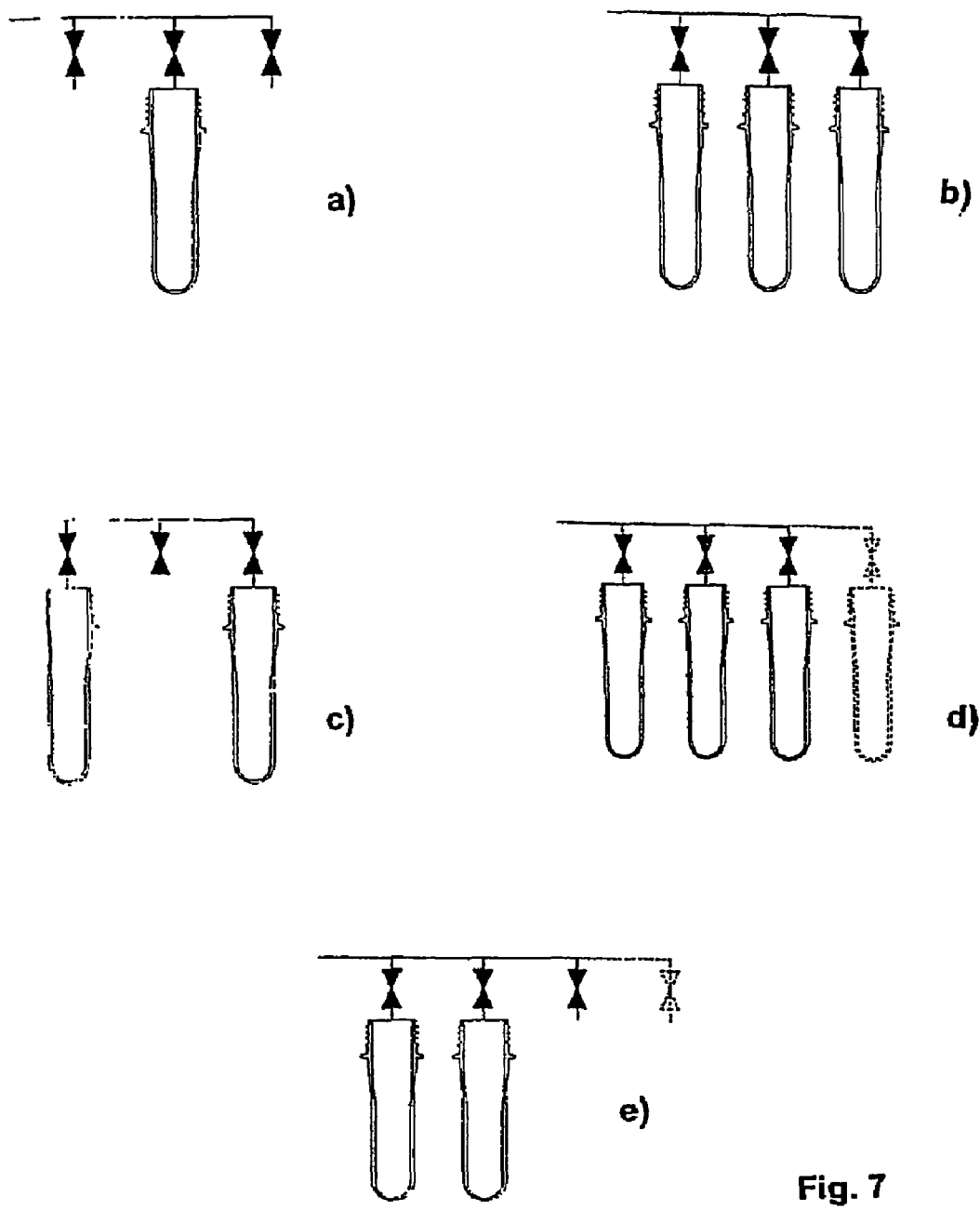

FIGS. 5a, b, c show three embodiments of a constituent element of the apparatus of FIG. 1;

FIG. 6 diagrammatically shows part of the supply circuit of blowing fluid of the apparatus of FIG. 1;

FIGS. 7a) to 7e) diagrammatically show parison arrangements in the blow moulds in various phases of operation of the apparatus of FIG. 1.

Preferred embodiments of the invention are described in the dependent claims. Other objects and advantages of the present invention will become apparent from the detailed description that follows with reference to preferred embodiments of the blow-moulding apparatus and which do not exclude possible other embodiments and improvements.

DESCRIPTION OF A PREFERRED EMBODIMENT OF THE INVENTION

In the outer peripheral zone of a turntable 1 rotating about a vertical axis X, copies of semi-moulds 2, 3 are arranged, which together form a respective blow mould 4', 4", 4'''. In this embodiment illustrated in the figures, each mould contains three blow forms and, by way of example but not necessarily, these are three bottles 5, 6, 7, since machines of this type can be used for manufacturing other types of plastic containers of the most varied dimensions. Some embodiments also provide a third part 8 for the semi-mould, which is used to mould the bottom part or floor of the bottle. In the description, reference will be made to the bottles on the understanding that the solutions according to the invention are applicable also to the cases of other types of containers. A semi-mould 2 of each copy 4', 4", 4''' is linked with the turntable and is arranged in its vertical plane with the respective hemi-cavity comprised of three forms 5, 6, 7 turned towards the outside of the turntable 1. For the purpose of clarity, the turntable has been represented in the figure with only three forms, omitting the other forms that are normally arranged on the remaining circumference.

The other semi-mould 3 of each copy is mobile relative to the first semi-mould 2 having rotary motion about a respective second axis Y arranged on the horizontal plane, perpendicular to the axis X of the turntable 1.

The embodiment, wherein one mould 4' contains three mould forms makes it possible to increase the rate of production of the bottles up to practically tripling it with respect to the configuration in which the mould has only one form. This embodiment of a mould having one or two forms is not represented in the figures, since these are known standard configurations.

Figure 5:
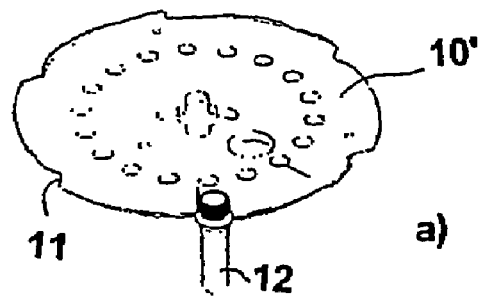
Figure 5:
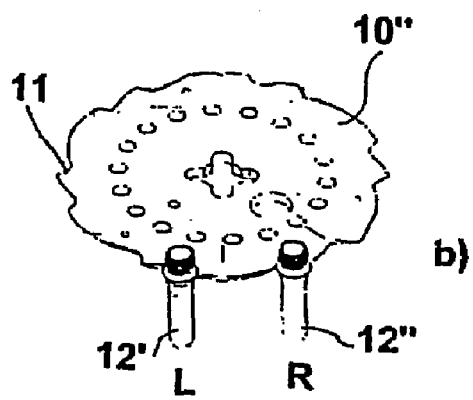

In addition, the fact of advantageously having three bottle mould forms available in each mould 4', 4", 4''' makes it possible for the user to add maximum flexibility of use, the moulding apparatus being capable of working both with a feed of one single mould form or two forms, in lieu of being occupied by all three parison shapes. This flexibility is sometimes required by some users, because it is achieved without replacing the moulds with two form moulds or with a single form. This advantage is achieved by means of providing one distribution device for simple parisons, which can be easily substituted. The distribution device to be substituted comprises a distribution star 10 having a predetermined contour, which has several recesses 19 suitably distributed along the peripheral circumference. Using the substitution of the single star 10 and redefinition of the control system of the moulding system, there is the possibility of working by supplying only one or two forms for each mould in all of the cycles. FIG. 5 represents three variants of the distribution star 10.

Figure 4:
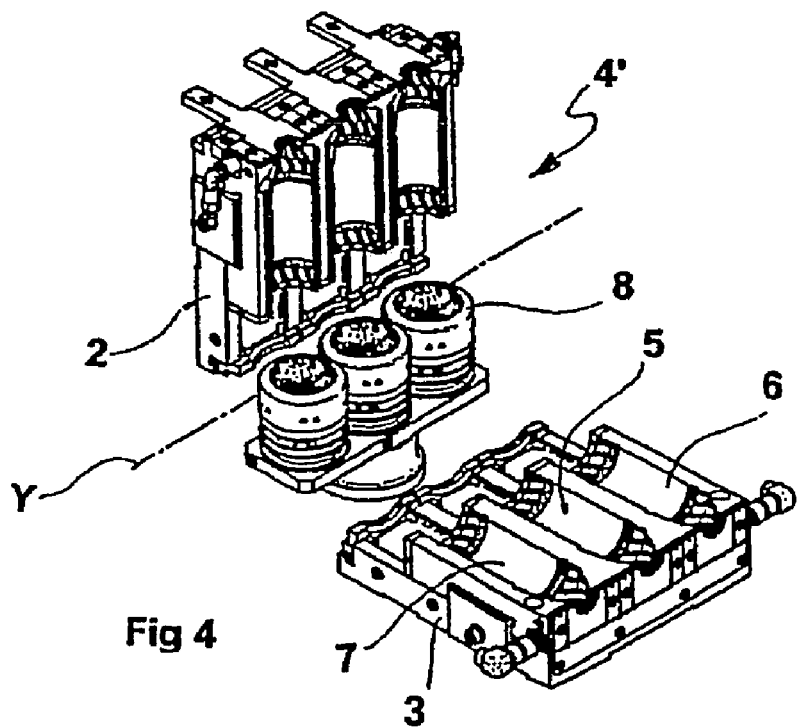
FIG. 4 shows a perspective view of an element of the mould of the apparatus of FIG. 1.

In FIG. 5a), the star 10' distributes parisons 12 (indicated with C) so as to supply the central form 5 of the mould illustrated in FIG. 4. In this embodiment the recesses are equidistant from each other along the entire perimeter and the parisons 12 are arranged in such a fashion as to be inserted into the inside space of a single form of each mould, leaving empty two of the forms of each mould, which are preferably but not necessarily, the lateral forms and filling the central figure. The moulds of the turntable 1 operate in this fashion at a capacity of two-thirds below maximum productivity. The drawing of this variant is represented in FIG. 7a).

In FIG. 5b) the star 10" of a second variant having recesses 11 arranged over the perimeter of the star 10" in a fashion different from that of FIG. 5a) distributes the parisons 12', 12" (indicated with the literals L and R), into cavities 6 and 7 of the mould illustrated in FIG. 4. In this configuration, the moulds of the turntable operate at a capacity of about one-third less with respect to maximum productivity. The drawing of this variant is represented in FIG. 7c).

In FIG. 5c) the star 10''' of a third variant having the recesses 11 arranged over the perimeter of the star 10''' in a fashion different from that of FIGS. 5a) and 5b) distributes the parisons 12', 12", 12''' (indicated with the literals L, C and R) into respective cavities 6, 5 and 7 of the mould illustrated in FIG. 4.

The distribution star 10''' is capable of grasping the parisons in any recess and moving them along the supply route of the moulds at the distance that causes them to enter into each of the forms of each of the moulds. The drawing of this variant is represented in FIG. 7b). The transmission of the parisons from the distribution star to the turntable is advantageously done by means of a parison transmission cam 15 of a suitable type, which makes it possible to effect a complex movement of the parisons in order for them to be inserted into the forms of each mould. In fact, only the central form 5 of each mould 4 is positioned on the outer circumference of the turntable 1, whilst the axes of symmetry of the forms 6 and 7 or each mould are disposed on a line running tangentially to the outer circumference of the turntable.

In this embodiment described here three forms are advantageous but it is possible to provide moulds with higher numbers of forms, advantageously adapting the supply and control system, this blow moulding layout is represented in FIG. 7d).

In accordance with the diameter of the turntable, the moulding apparatus is more flexible relative to machines of the prior art, since it is possible to use various types of moulds in which, there can be three bottle forms of lesser capacity or moulds with two bottle forms with a slightly greater capacity and moulds with a form for a single bottle of even greater capacity. This provides considerable commercial advantage.

It is possible, by suitably programming the control system of the bottle manufacturing machine comprising the moulding apparatus, varying the arrangement of the forms of each mould that are to be filled with the parisons, when it is planed to have the turntable operate only at partial load or with the distribution start of FIGS. 5a) and 5b).

The control system of the bottle manufacturing machine consists preferably of a computerized control system, which can be suitably programmed as a function of the production that is expected to be obtained using the machine.

This control system regulates the different functions of the machine and, in particular, also the blowing elements of the parsons. These blowing elements, which operate generally with high pressure blow air, are arranged so that each of the forms that are contained in each of the moulds can be regulated independently of the others. This method for controlling the bottle blowing devices is not only advantageous in making it possible to operate the production machine at reduced load but also offers the advantage of making it possible to prevent blowing a form belonging to a particular mould that may not be supplied with the parison intended for it because of any unforeseen event. In fact, the control of the moulding apparatuses of the prior art provides only the possibility of shutting down supply to all of the forms that are included in each mould. In this fashion, the failure to insert a single parison into a form causes loss of two bottles of one mould. The drawing of this variant is represented in FIG. 7e).

This flexibility of operation is obtained by providing a blowing fluid distribution circuit having an independent regulation system of pneumatic valves 21, 22, 23 and a fluid interrupter valve 24 to the entire mould 4.

The invention claimed is:

1. A blow molding apparatus for plastic objects, in particular for PET bottles, usable with parisons, comprising;
   a plurality of molds arranged along a circumference capable of rotating about a first axis, each mold comprising at least two semi-molds capable of opening and closing to form mold forms of said objects,
   a system for opening and closing the semi-molds by a relative rotational movement between the respective semi-molds about a second axis perpendicular to the first axis,
   a supply device for supplying said parisons to the molds,
   a control system for regulating said parison supply device, having a controller for regulating the supply of fluid under pressure to the mold forms of each of the molds, in the event of interruption, and for performing a blowing operation only in mold forms in which there is a parison, a system for supplying fluid under pressure for the blowing operation of the parisons and for regulating said means suitable to perform the opening and closing operations of the molds, wherein each mold contains at least three mold forms defining coplanar axes of symmetry, and a detector which detects the presence of a parison in each mold form.

2. The apparatus according to claim 1, wherein the device for supplying parisons comprises a supply star provided with a plurality of peripheral recesses mutually spaced at predetermined intervals, having means suitable to provide a supply of parisons into the mold forms of each mold in accordance with a predetermined sequence.

3. The apparatus according to claim 2, wherein all of the distances between two adjacent recesses of the star are equal to each other.

4. The apparatus according to claim 2, wherein the distance separating one recess from the preceding one is different from the distance separating the same recess from the one that follows.

5. The apparatus according to claim 3, wherein the molds are arranged in a fashion so that predefined axes of the mold forms belonging to each mold extend on a plane tangential to the circumference.

6. A method for blow molding of plastic objects using an apparatus according to claim 1, comprising the following steps:

transporting parisons to the distribution star of the molding apparatus;

spacing the parisons by means of the distribution star in accordance with a predetermined criterion in order to insert a parison into the predefined molding forms;

detecting the presence of the parison in each mold form using detection means;

supplying fluid under pressure to each molding form containing the respective parison, so as to blow mold the plastic object;

simultaneously blocking of the supply of fluid under pressure to mold forms not containing parisons.

* * * * *